(12) United States Patent
Walloch et al.

(10) Patent No.: US 8,747,550 B1
(45) Date of Patent: Jun. 10, 2014

(54) WATER-REPELLENT ADMIXTURES FOR CEMENTITIOUS MATERIALS

(71) Applicant: ACM Chemistries, Inc., Norcross, GA (US)

(72) Inventors: Craig T. Walloch, Norcross, GA (US); Theodore G. Light, Suwanee, GA (US); Marshall L. Brown, Berkeley Lake, GA (US); Matthew J. Oesterle, Flowery Branch, GA (US)

(73) Assignee: ACM Chemistries, Inc., Norcross, GA (US)

( * ) Notice: Subject to any disclaimer, the term of this patent is extended or adjusted under 35 U.S.C. 154(b) by 0 days.

(21) Appl. No.: 13/687,599

(22) Filed: Nov. 28, 2012

Related U.S. Application Data (60) Provisional application No. 61/565,319, filed on Nov. 30, 2011.

(51) Int. Cl.
| | |
|---|---|
| *C04B 24/06* | (2006.01) |
| *C04B 28/00* | (2006.01) |
| *C04B 103/65* | (2006.01) |
| *C04B 111/00* | (2006.01) |
| *C04B 111/27* | (2006.01) |

(52) U.S. Cl.
CPC ............... *C04B 24/06* (2013.01); *C04B 28/00* (2013.01); *C04B 2103/65* (2013.01); *C04B 2111/00517* (2013.01); *C04B 2111/27* (2013.01)
USPC ........... 106/810; 106/691; 106/696; 106/708; 106/728; 106/778; 106/790; 106/795; 106/823

(58) Field of Classification Search
CPC .... C04B 24/06; C04B 28/00; C04B 2103/65; C04B 2111/00517; C04B 2111/27
USPC ......... 106/728, 802, 810, 691, 696, 708, 778, 106/790, 795, 823
See application file for complete search history.

(56) References Cited

U.S. PATENT DOCUMENTS 7,410,538 B2 * 8/2008 Butler et al. .................. 106/806

FOREIGN PATENT DOCUMENTS

| CA | 2780556 A1 * | 5/2011 |
| EP | 2085367 A2 * | 8/2009 |

OTHER PUBLICATIONS

Derwent-Acc-No. 2007-735657, abstract of Russian Patent Specification No. RU 2303579 C1 (Jul. 2007).*
Derwent-Acc-No. 2008-E18930, abstract of Russian Patent Specification No. RU 2311377 C2 (Nov. 2007).*

* cited by examiner

*Primary Examiner* — Anthony J Green
(74) *Attorney, Agent, or Firm* — Altera Law Group, LLC (57) ABSTRACT

The present disclosure provides improved water-repellent admixtures for cementitious materials. The water-repellent admixtures are incorporated during masonry processing to improve the water resistance of the final product. Solid water-repellent admixtures may be conveniently incorporated into pre-blended dry mortar mixes. In some variations, a pre-blended dry mortar mix comprises a cementitious material, an aggregate, and a dry water-repellent admixture, wherein the water-repellent admixture contains one or more materials selected from the group consisting of silanes, siloxanes, free fatty acids, fatty acid derivatives, particulated polymers, and particulated copolymers, and wherein the water-repellent admixture is present in the pre-blended dry mortar mix in a dosage from about 0.01% to about 1.00% by weight of the pre-blended dry mortar mix. Water repellency is achieved while maintaining workability as well as the properties of the hardened mortar, including compressive strength and bond strength to other substrates, such as clay or concrete masonry units.

17 Claims, 5 Drawing Sheets

FIG. 1

| | Water Uptake %AT (Rel to Blank) | Rel Comp Strength | % Air | Δ % Air | w/c | Δ % w/c | Meet All Criteria |
|---|---|---|---|---|---|---|---|
| Ideal Product Goals | < 45 | 90 to 110% | | 0 to +2% for PC/L -3 to +3% for MC | | -5 to +5% | |
| Standard Sands PC/L - Made 5/4 & 5/5/11 | | | | | | | |
| X - Control | Set 1 | 100 | 100% | 7.2 | 0.0 | 0.678 | 0.0% | |
| A - 0.20% | Set 3 | 40 | 55% | 16.8 | 9.6 | 0.678 | 0.0% | |
| B - 0.20% | Set 4 | 30 | 100% | 6.2 | (1.0) | 0.678 | 0.0% | x |
| C - 0.20% | Set 5 | 30 | 95% | 6.9 | (0.3) | 0.678 | 0.0% | x |
| D - 0.20% | Set 6 | 30 | 94% | 6.8 | (0.4) | 0.694 | 2.4% | |
| E - 0.20% | Set 11 | 34 | 93% | 6.2 | (1.0) | 0.678 | 0.0% | x |
| F - 0.20% | Set 12 | 76 | 101% | 6.0 | (1.2) | 0.678 | 0.0% | |
| G - 0.20% | Set 13 | 34 | 95% | 6.4 | (0.8) | 0.678 | 0.0% | x |
| A - 0.12% | Set 7 | 60 | 48% | 17.5 | 10.3 | 0.678 | 0.0% | |
| B - 0.12% | Set 8 | 46 | 102% | 6.9 | (0.3) | 0.678 | 0.0% | x |
| C - 0.12% | Set 9 | 45 | 96% | 7.3 | 0.1 | 0.678 | 0.0% | x |
| D - 0.12% | Set 10 | 45 | 90% | 6.6 | (0.6) | 0.691 | 1.9% | |
| E - 0.12% | Set 14 | 48 | 95% | 6.1 | (1.1) | 0.678 | 0.0% | |
| F - 0.12% | Set 15 | 86 | 100% | 6.5 | (0.7) | 0.678 | 0.0% | |
| G - 0.12% | Set 16 | 47 | 101% | 6.9 | (0.3) | 0.678 | 0.0% | |
| A - 0.080% | Set 17 | 69 | 57% | 14.5 | 7.3 | 0.678 | 0.0% | |
| B - 0.080% | Set 18 | 56 | 99% | 6.7 | (0.5) | 0.678 | 0.0% | |
| C - 0.080% | Set 19 | 55 | 96% | 7.3 | 0.1 | 0.678 | 0.0% | |
| D - 0.080% | Set 20 | 54 | 94% | 6.4 | (0.8) | 0.686 | 1.2% | |
| E - 0.080% | Set 21 | 58 | 93% | 6.9 | (0.3) | 0.678 | 0.0% | |
| F - 0.080% | Set 22 | 89 | 100% | 6.7 | (0.5) | 0.678 | 0.0% | |
| G - 0.080% | Set 23 | 60 | 103% | 6.3 | (0.9) | 0.678 | 0.0% | |

FIG. 2

| | Water Uptake %AT (Rel to Blank) | Rel Comp Strength | % Air | Δ % Air | w/c | Δ % w/c | Meet All Criteria |
|---|---|---|---|---|---|---|---|
| Ideal Product Goals | < 45 | 90 to 110% | | 0 to +2% for PC/L -3 to +3% for MC | | -5 to +5% | |
| Chicago PC/L Materials - Made 5/12/11 | | | | | | | |
| X - Control | 100 | 100% | 5.8 | 0.0 | 0.842 | 0.0% | |
| B - 0.20% | 34 | 105% | 4.7 | (0.9) | 0.837 | (0.6%) | x |
| C - 0.20% | 35 | 105% | 5.0 | (0.6) | 0.837 | (0.6%) | x |
| D - 0.20% | 33 | 105% | 4.9 | (0.7) | 0.845 | 0.4% | x |
| E - 0.20% | 36 | 107% | 4.4 | (1.2) | 0.837 | (0.6%) | x |
| G - 0.20% | 35 | 112% | 5.4 | (0.2) | 0.837 | (0.6%) | |
| B - 0.15% | 40 | 116% | 6.3 | 0.7 | 0.837 | (0.6%) | x |
| C - 0.15% | 40 | 102% | 5.2 | (0.4) | 0.837 | (0.6%) | x |
| D - 0.15% | 39 | 104% | 5.4 | (0.2) | 0.845 | 0.4% | x |
| E - 0.15% | 45 | 108% | 4.8 | (0.8) | 0.837 | (0.6%) | x |
| G - 0.15% | 47 | 108% | 4.9 | (0.7) | 0.837 | (0.6%) | |
| Chicago PC/L Materials - Made 5/17/11 | | | | | | | |
| X - Ctrl | 100 | 100% | 6.1 | 0.9 | 0.837 | 0.0% | |
| K - 0.20%M | 34 | 81% | 9.1 | 3.9 | 0.837 | 0.0% | |
| L - 0.20%M | 33 | 57% | 18.9 | 13.7 | 0.837 | 0.0% | |
| M - 0.20%M | 25 | 95% | 6.1 | 0.9 | 0.837 | 0.0% | x |
| N - 0.20%M | 35 | 113% | 4.7 | (0.5) | 0.837 | 0.0% | |
| K - 0.15%M | 39 | 81% | 8.9 | 3.7 | 0.837 | 0.0% | |
| M - 0.15%M | 41 | 96% | 6.2 | 1.0 | 0.837 | 0.0% | x |
| N - 0.15%M | 46 | 115% | 4.1 | (1.1) | 0.837 | 0.0% | |

FIG. 3

| | Water Uptake %AT (Rel to Blank) | Rel Comp Strength | % Air | Δ % Air | w/c | Δ % w/c | Meet All Criteria |
|---|---|---|---|---|---|---|---|
| Ideal Product Goals | < 45 | 90 to 110% | | 0 to +2% for PC/L -3 to +3% for MC | | -5 to +5% | |
| Chicago PC/L Materials - Made 6/2/11 | | | | | | | |
| X - Ctrl | 100 | 100% | 6.1 | 6.1 | 0.837 | 0.0% | |
| E - 0.20%M | 39 | 106% | 4.5 | 4.5 | 0.837 | 0.0% | x |
| G - 0.20%M | 36 | 105% | 5.9 | 5.9 | 0.837 | 0.0% | x |
| K - 0.20%M | 34 | 81% | 9.6 | 9.6 | 0.837 | 0.0% | |
| M - 0.20%M | 33 | 95% | 7.4 | 7.4 | 0.837 | 0.0% | x |
| E - 0.15%M | 45 | 113% | 4.7 | 4.7 | 0.837 | 0.0% | |
| G - 0.15%M | 45 | 119% | 4.9 | 4.9 | 0.837 | 0.0% | |
| K - 0.15%M | 41 | 77% | 9.2 | 9.2 | 0.837 | 0.0% | |
| M - 0.15%M | 40 | 92% | 6.5 | 6.5 | 0.837 | 0.0% | x |
| Florida MC Materials - Made 6/2/11 | | | | | | | |
| X - Ctrl | 100 | 100% | 20.1 | 0.0 | 0.625 | 0.0% | |
| E - 0.20%M | 44 | 115% | 14.3 | (5.8) | 0.641 | 2.5% | |
| G - 0.20%M | 41 | 119% | 14.9 | (5.3) | 0.641 | 2.5% | |
| K - 0.20%M | 38 | 88% | 19.9 | (0.3) | 0.641 | 2.5% | |
| M - 0.20%M | 37 | 101% | 16.4 | (3.7) | 0.641 | 2.5% | |
| E - 0.15%M | 51 | 116% | 15.4 | (4.7) | 0.641 | 2.5% | |
| G - 0.15%M | 53 | 105% | 16.2 | (3.9) | 0.641 | 2.5% | |
| K - 0.15%M | 43 | 88% | 20.5 | 0.4 | 0.641 | 2.5% | |
| M - 0.15%M | 46 | 98% | 17.1 | (3.0) | 0.645 | 3.2% | |

FIG. 4

| | | Water Uptake %AT (Rel to Blank) | Rel Comp Strength | % Air | Δ % Air | w/c | Δ % w/c | Meet All Criteria |
|---|---|---|---|---|---|---|---|---|
| Ideal Product Goals | | < 45 | 90 to 110% | | 0 to +2% for PC/L; -3 to +3% for MC | | -5 to +5% | |
| Chicago PC/L Materials - Made 10/4/11 | | | | | | | | |
| X - Ctrl | Set 101 | 100 | 100% | 6.0 | 0.0 | 0.821 | 0.0% | |
| 1.00G / 0.00K - 0.20%M | Set 102 | 38 | 111% | 4.6 | (1.4) | 0.821 | 0.0% | x |
| 0.83G / 0.17K - 0.20%M | Set 103 | 35 | 100% | 5.7 | (0.3) | 0.821 | 0.0% | x |
| 0.67G / 0.33K - 0.20%M | Set 104 | 35 | 97% | 7.1 | 1.0 | 0.821 | 0.0% | x |
| 0.50G / 0.50K - 0.20%M | Set 105 | 36 | 92% | 6.4 | 0.4 | 0.821 | 0.0% | x |
| 0.00G / 1.00K - 0.20%M | Set 106 | 35 | 82% | 8.0 | 1.9 | 0.821 | 0.0% | |
| Florida MC Materials - Made 10/4/11 | | | | | | | | |
| X - Ctrl | Set 111 | 100 | 100% | 19.7 | 0.0 | 0.612 | 0.0% | |
| 1.00G / 0.00K - 0.20%M | Set 112 | 40 | 117% | 15.2 | (4.4) | 0.625 | 2.2% | |
| 0.83G / 0.17K - 0.20%M | Set 113 | 40 | 110% | 15.8 | (3.8) | 0.628 | 2.6% | |
| 0.67G / 0.33K - 0.20%M | Set 114 | 38 | 103% | 16.8 | (2.9) | 0.628 | 2.6% | x |
| 0.50G / 0.50K - 0.20%M | Set 115 | 37 | 97% | 18.0 | (1.7) | 0.625 | 2.2% | x |
| 0.00G / 1.00K - 0.20%M | Set 116 | 33 | 91% | 18.5 | (1.2) | 0.625 | 2.2% | x |

FIG. 5

| | | Water Uptake %AT (Rel to Blank) | Rel Comp Strength | % Air | Δ % Air | w/c | Δ % w/c | Meet All Criteria |
|---|---|---|---|---|---|---|---|---|
| Ideal Product Goals | | < 45 | 90 to 110% | | 0 to +2% for PC/L -3 to +3% for MC | | -5 to +5% | |
| Mississippi MC Materials - Made 8/15/12 | | | | | | | | |
| X - Ctrl | Set 310 | 100 | 100% | 16.7 | 0.0 | 0.540 | 0.0% | |
| E-0.20%M | Set 312 | 41 | 115% | 11.2 | (5.5) | 0.573 | 6.1% | |
| E-0.13%M | Set 313 | 54 | 106% | 13.1 | (3.6) | 0.568 | 5.2% | |
| E-0.10%M | Set 314 | 62 | 111% | 13.6 | (3.1) | 0.556 | 3.0% | |
| 0.55G / 0.45K - 0.20%M | Set 311 | 41 | 101% | 14.8 | (1.9) | 0.563 | 4.3% | x |
| 0.55G / 0.45K - 0.14%M | Set 318 | 39 | 98% | 15.0 | (1.7) | 0.553 | 2.4% | x |
| 0.55G / 0.45K - 0.12%M | Set 319 | 45 | 100% | 15.2 | (1.5) | 0.551 | 2.0% | x |
| 0.55G / 0.45K - 0.10%M | Set 320 | 50 | 100% | 15.7 | (1.0) | 0.551 | 2.0% | |

WATER-REPELLENT ADMIXTURES FOR CEMENTITIOUS MATERIALS

PRIORITY DATA

This patent application claims priority to U.S. Patent App. No. 61/565,319, filed Nov. 30, 2011, which is hereby incorporated by reference herein in its entirety.

FIELD

This disclosure relates to water-repellent additives intended for various cementitious materials and masonry products.

BACKGROUND

Admixtures are generally added to a concrete batch before or during mixing. A proper use of admixtures offers certain beneficial effects to concrete, mortars, and other masonry materials, including improved quality, acceleration or retardation of setting time, enhanced frost and sulfate resistance, control of strength development, improved workability, improved water repellency, and enhanced finishability.

Admixtures vary widely in chemical composition, and many perform more than one function. Two basic types of admixtures are available: chemical and mineral. Mineral admixtures (fly ash, silica fume, and slags) are usually added to concrete in larger amounts to enhance the workability of fresh concrete; to improve resistance of concrete to thermal cracking, alkali-aggregate expansion, and sulfate attack; and to enable a reduction in cement content. Chemical admixtures are added to concrete in small amounts mainly for the entrainment of air, reduction of water or cement content, plasticization of fresh concrete mixtures, or control of setting time.

Water-repellent additives have been incorporated into hydraulic cement-based products for decades, serving to resist moisture, such as rain water, from penetrating excessively into materials, such as masonry mortars. Reducing moisture penetration can help to resist mold and mildew, to protect against cracks, and to resist efflorescence stains. Reducing water absorption also prevents or minimizes the damaging effects of freeze-thaw cycles.

The degree of water repellency that is attained when a water-repellent admixture is added to a cement-based masonry mortar should comply with the performance set forth in ASTM C1384, Standard Specification for Admixtures for Masonry Mortars.

Water repellency should be achieved by the water-repellent admixture while avoiding a significant change in the air content of the cement-based material. By not significantly changing the air content, the workability of the plastic mortar as well as the properties of the hardened mortar including the compressive strength of the mortar and the bond strength of the mortar to other substrates, such as clay or concrete masonry units, are not adversely affected.

There remains a need to improve and optimize water-repellent admixtures for cementitious materials. Improved compositions are needed for water-repellent admixtures that may be incorporated during masonry processing and construction, to improve the water resistance of the final concrete, hardened mortar, grout, or other product. Additionally, dry water-repellent admixtures would be desirable so that the admixtures may be conveniently incorporated into pre-blended dry mortar mixes. It is known that liquid additives can pose difficulties during processing.

SUMMARY OF THE DISCLOSURE

This summary is provided to assist the reader in understanding the full disclosure but is not a limitation of that disclosure. The claims define the scope of the invention.

In some variations, a pre-blended dry mortar mix comprises a cementitious material, an aggregate, and a dry water-repellent admixture, wherein the water-repellent admixture contains (i) at least one stearate selected from the group consisting of calcium stearate, aluminum stearate, zinc stearate, sodium stearate, and magnesium stearate; and (ii) at least one oleate selected from the group consisting of sodium oleate, potassium oleate, magnesium oleate, and calcium oleate;

wherein the water-repellent admixture is present in the dry mortar mix in a dosage from about 0.10% to about 0.50% by weight of the dry mortar mix;

wherein the dry mortar mix is combinable with water to form a masonry mortar, which is curable to form a hardened mortar; and wherein the dry mortar mix is characterized by the following properties:

(a) water demand of the dry mortar mix, to form the masonry mortar, is within 5% of water demand of a dry mortar mix that does not contain the water-repellent admixture;

(b) air content of the masonry mortar is within about 3 percentage points (on a volume basis) of air content of a masonry mortar that does not contain the water-repellent admixture;

(c) the hardened mortar has water uptake of about 50% or less of water uptake of a blank mortar that does not contain the water-repellent admixture, when tested in accordance with ASTM C1403; and (d) the hardened mortar has compressive strength within about 15% of compressive strength of a blank mortar that does not contain the water-repellent admixture.

In some embodiments, the water-repellent admixture is present in the dry mortar mix in a dosage from about 0.10% to about 0.30% by weight of the dry mortar mix.

In some embodiments, at least one stearate is calcium stearate and at least one oleate is sodium oleate. The water-repellent admixture may have a stearate/oleate mass ratio of 1 or more, such as from 2 to 10, such as from 3 to 5.

The air content of the masonry mortar containing the water-repellent admixture may be within about 2 percentage points (on a volume basis) of a masonry mortar that does not contain the water-repellent admixture.

In some embodiments, the cured hardened mortar has a water uptake of about 45% or less of the water uptake of a blank mortar that does not contain the water-repellent admixture, when tested in accordance with ASTM C1403. The hardened mortar may have a compressive strength within about 10% of compressive strength of a blank mortar that does not contain the water-repellent admixture. In certain embodiments, the bond strength of the hardened mortar is within about 15% of bond strength of a blank mortar that does not contain the water-repellent admixture.

Other variations provide a masonry mortar containing water and a pre-blended dry mortar mix comprising a cementitious material, an aggregate, and a water-repellent admixture, wherein the water-repellent admixture contains (i) at least one stearate selected from the group consisting of calcium stearate, aluminum stearate, zinc stearate, sodium stearate, and magnesium stearate; and (ii) at least one oleate selected from the group consisting of sodium oleate, potassium oleate, magnesium oleate, and calcium oleate;

wherein the water-repellent admixture is present in the dry mortar mix in a dosage from about 0.10% to about 0.50% by weight of the dry mortar mix;

wherein water demand of the dry mortar mix, to form the masonry mortar, is within 5% of water demand of a dry mortar mix that does not contain the water-repellent admixture; and wherein air content of the masonry mortar is within about 3 percentage points (on a volume basis) of air content of a masonry mortar that does not contain the water-repellent admixture.

Other variations provide a cured hardened mortar containing a pre-blended dry mortar mix comprising a cementitious material, an aggregate, and a water-repellent admixture, wherein the water-repellent admixture contains (i) at least one stearate selected from the group consisting of calcium stearate, aluminum stearate, zinc stearate, sodium stearate, and magnesium stearate; and (ii) at least one oleate selected from the group consisting of sodium oleate, potassium oleate, magnesium oleate, and calcium oleate;

wherein the water-repellent admixture is present in the dry mortar mix in a dosage from about 0.10% to about 0.50% by weight of the dry mortar mix;

wherein the hardened mortar has water uptake of about 50% or less of water uptake of a blank mortar that does not contain the water-repellent admixture, when tested in accordance with ASTM C1403; and wherein the hardened mortar has compressive strength within about 15% of compressive strength of a blank mortar that does not contain the water-repellent admixture.

In some variations, this disclosure provides a pre-blended dry mortar mix comprising a cementitious material, an aggregate, and a dry water-repellent admixture, wherein the water-repellent admixture contains one or more materials selected from the group consisting of silanes, siloxanes, free fatty acids, fatty acid derivatives, particulated polymers, and particulated copolymers, and wherein the water-repellent admixture is present in the pre-blended dry mortar mix in a dosage from about 0.01% to about 1.00% by weight of the pre-blended dry mortar mix.

In some embodiments, the water-repellent admixture contains saturated or unsaturated $C_{16}$-$C_{18}$ fatty acids, or derivatives thereof. In certain embodiments, the water-repellent admixture contains a combination of calcium and sodium salts of $C_{16}$-$C_{18}$ fatty acids, wherein the sodium salt comprises up to about 50% of the combined weight of the calcium and sodium salts of $C_{16}$-$C_{18}$ fatty acids.

In some embodiments, the water-repellent admixture contains one or more fatty acid derivatives of the formula:

$$R_{FA}COO\text{-}A$$

wherein $R_{FA}$ is a $C_7$-$C_{29}$ alkyl(ene) group; and wherein A is H, a $C_1$-$C_{12}$ linear or branched alkyl group, an alkali or alkaline earth metal cation, a polyvalent cation, or a $C_1$-$C_{12}$ linear or branched alkyl or alkanol amine.

In some embodiments, the water-repellent admixture contains stearates and/or oleates. The water-repellent admixture may contain one or more stearates selected from the group consisting of calcium stearate, aluminum stearate, zinc stearate, sodium stearate, and magnesium stearate. The water-repellent admixture may contain sodium oleate. In certain embodiments, the water-repellent admixture contains a blend consisting of a first source of calcium stearate combined with a mixture containing sodium oleate and a second source of calcium stearate that is different from the first source of calcium stearate.

In some embodiments, the water-repellent admixture contains a particulated polymer or copolymer selected from the group consisting of polyepoxide, polystyrene-butadiene, polyvinyl acetate, polyacrylonitile-butadiene, polyacrylic ester, polyvinylidene chloride-vinyl chloride, polyethylene-vinylacetate, polyurethane, acrylic latex, polymethacrylic ester, and combinations thereof.

The water-repellent admixture may be present in the pre-blended dry mortar mix in a dosage from about 0.05% to about 0.50% by weight of the pre-blended dry mortar mix, such as from about 0.10% to about 0.30% or from about 0.12% to about 0.25% by weight of the pre-blended dry mortar mix.

The pre-blended dry mortar mix may be combined with water to form a masonry mortar. There will be certain water requirements, or water demand, of the pre-blended dry mortar mix in order to produce a masonry mortar.

In some embodiments, the water demand of the pre-blended dry mortar mix containing the water-repellent admixture is within 10% of the water demand of a pre-blended dry mortar mix without the water-repellent admixture. In certain embodiments, the water demand of the pre-blended dry mortar mix containing the water-repellent admixture is within 5% of the water demand of a pre-blended dry mortar mix without the water-repellent admixture.

In some embodiments, the air content of the masonry mortar containing the water-repellent admixture is within about 3 percentage points (on a volume basis) of a masonry mortar that does not contain the water-repellent admixture. In some embodiments, the air content of the masonry mortar containing the water-repellent admixture is within about 2 percentage points (on a volume basis) of a masonry mortar that does not contain the water-repellent admixture.

In some embodiments, a hardened mortar has a water uptake of less than or equal to 50% of the water uptake of a blank mortar that does not contain the water-repellent admixture, when tested in accordance with ASTM C1403. In certain embodiments, the hardened mortar has a water uptake of about 45% or less of the water uptake of a blank mortar that does not contain the water-repellent admixture, when tested in accordance with ASTM C1403. Preferably, the hardened mortar conforms to the water-repellent requirements pursuant to ASTM C1384.

In some embodiments, the compressive strength of the hardened mortar containing the water-repellent admixture is within about 15% of the compressive strength of a blank mortar that does not contain the water-repellent admixture. In certain embodiments, the compressive strength of the hardened mortar containing the water-repellent admixture is within about 10% of the compressive strength of a blank mortar that does not contain the water-repellent admixture.

In some embodiments, the bond strength of the hardened mortar containing the water-repellent admixture is within about 15% of the bond strength of a blank mortar that does not contain the water-repellent admixture. In certain embodiments, the bond strength of the hardened mortar containing the water-repellent admixture is within about 10% of the bond strength of a blank mortar that does not contain the water-repellent admixture.

Some variations provide a composition comprising a cementitious material and a dry water-repellent admixture, wherein the water-repellent admixture contains one or more materials selected from the group consisting of silanes, siloxanes, free fatty acids, fatty acid derivatives, stearates, oleates, particulated polymers, and particulated copolymers, and wherein the water-repellent admixture is present in the composition in a concentration from about 0.03 wt % to about 5 wt %.

In some embodiments, the water-repellent admixture is present in the composition in a concentration from about 0.15 wt % to about 2.5 wt %, such as from 0.30 wt % to about 1.5 wt %.

The composition comprising a cementitious material and a dry water-repellent admixture may further comprise an aggregate, such as sand or small rocks. When the composition is combined with water, a masonry mortar may be formed.

In some embodiments, the air content of the masonry mortar containing the water-repellent admixture is within about 3 percentage points, or within about 2 percentage points (on a volume basis) of a masonry mortar that does not contain the water-repellent admixture.

A hardened mortar may be produced by curing the masonry mortar. Preferably, the hardened mortar has a water uptake of less than or equal to 50% of the water uptake of a blank mortar that does not contain the water-repellent admixture, when tested in accordance with ASTM C1403. Preferably, the hardened mortar conforms to the water-repellent requirements pursuant to ASTM C1384.

In some embodiments, the compressive strength of the hardened mortar containing the water-repellent admixture is within about 10% of the compressive strength of a blank mortar that does not contain the water-repellent admixture. In some embodiments, the bond strength of the hardened mortar containing the water-repellent admixture is within about 10% of the bond strength of a blank mortar that does not contain the water-repellent admixture.

Other variations provide a dry water-repellent admixture for a cementitious material, the water-repellent admixture comprising at least one stearate selected from the group consisting of calcium stearate, aluminum stearate, zinc stearate, sodium stearate, and magnesium stearate; and further comprising at least one oleate selected from the group consisting of sodium oleate, potassium oleate, magnesium oleate, and calcium oleate.

In some embodiments, the stearate is calcium stearate and the oleate is sodium oleate. In certain embodiments, the water-repellent admixture contains a blend consisting of a first calcium stearate combined with a mixture containing sodium oleate and a second calcium stearate that is different from the first calcium stearate. The second calcium stearate may have a different purity, particle size, lubricity, and/or water repellency, compared to the first calcium stearate.

Some embodiments provide a dry water-repellent admixture for a cementitious material, the water-repellent admixture comprising a combination of calcium and sodium salts of saturated and unsaturated $C_{16}$-$C_{18}$ fatty acids, wherein the sodium salt comprises up to about 50% of the combined weight of the calcium and sodium salts of $C_{16}$-$C_{18}$ fatty acids. In certain embodiments, the sodium salt comprises from about 5% to about 40%, such as from about 10% to about 30%, of the combined weight of the calcium and sodium salts of $C_{16}$-$C_{18}$ fatty acids.

Some embodiments provide a water-repellent admixture that comprises a particulated polymer or copolymer, such as a polymer selected from the group consisting of polyepoxide, polystyrene-butadiene, polyvinyl acetate, polyacrylonitile-butadiene, polyacrylic ester, polyvinylidene chloride-vinyl chloride, polyethylene-vinylacetate, polyurethane, acrylic latex, polymethacrylic ester, and combinations thereof.

Compositions may include a cementitious material and a water-repellent admixture as disclosed, to form a pre-blended dry mortar mix (or a precursor thereof). Compositions may further include an aggregate, to form a pre-blended dry mortar mix.

In some embodiments, the water-repellent admixture is present in a pre-blended dry mortar mix in a dosage of at least about 0.01% by weight of the pre-blended dry mortar mix. In certain embodiments, the water-repellent admixture is present in the pre-blended dry mortar mix in a dosage of at least about 0.10% by weight of the pre-blended dry mortar mix.

In some embodiments, the water-repellent admixture is present in the pre-blended dry mortar mix in a dosage of less than 1.00% by weight of the pre-blended dry mortar mix. In certain embodiments, the water-repellent admixture is present in the pre-blended dry mortar mix in a dosage of less than 0.50% by weight of the pre-blended dry mortar mix. For example, the water-repellent admixture may be present in the pre-blended dry mortar mix in a dosage from about 0.10% to about 0.30% by weight of the pre-blended dry mortar mix.

A masonry mortar may comprise water and any of the compositions disclosed. A hardened mortar may comprise a cured form of the masonry mortar.

DETAILED DESCRIPTION OF SOME EMBODIMENTS

This description will enable one skilled in the art to make and use the principles of the disclosure, and it describes several embodiments, adaptations, variations, alternatives, and uses of the disclosure.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs. As used herein, a "composition," "blend," "admixture," "admix," "formulation," or "mixture" are all intended to be used interchangeably.

Unless otherwise indicated, all numbers expressing parameters, conditions, concentrations, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The examples described herein are examples of the disclosure, including examples of various embodiments. None of the examples should be construed as limiting the principles of the invention, or its application, in any way.

The present disclosure is directed to various water-repellent admixtures intended for cementitious materials. As intended herein, a "water-repellent admixture" means any composition that, when combined with a base material, enhances the water repellency of the base material under conditions of use.

Cementitious materials are typically building materials which may be mixed with a liquid, such as water, to form a plastic paste, and to which an aggregate may be added in any amount. As intended herein, a "cementitious material" is broadly construed as any cement-based mixture, mortar, or the like; with or without water; and before, during, or after curing or setting into a hardened, structural material. Cementitious materials include Portland cement, limes, masonry cement, mortar cement, blended cement, slag cement, fly ash and other pozzolanic materials, and masonry mortar, for example.

Some variations provide a formulation of a solid water-repellent admixture comprising one or more hydrophobic components that, when added to a cement-based masonry mortar, imparts a degree of water repellency. The solid water-repellent admixture may be in a powdered form of various particle sizes and shapes. In some embodiments, the solid water-repellent admixture is a dry, fine powder. In certain embodiments, the solid water-repellent admixture is a dry mixture of fine powder and coarse particles, which may be pellets, spheres, or random shapes. In some embodiments, the solid water-repellent admixture is in a solid-liquid slurry, gel, emulsion, or other form in which the solid does not completely dissolve.

In some embodiments, the water-repellent admixture contains one or more materials selected from silanes, siloxanes, fatty acids, or fatty acid derivatives (including, but not limited to, salts).

Silanes as intended herein are alkyloxysilane chemical compounds of silicon, carbon, oxygen, and hydrogen. The general formula of an alkyloxysilane is $(R_1O)_nSi(R_2)_{4-n}$ where $R_1$ is a linear or branched $C_1$-$C_3$ alkyl, n equals 1 to 3, and $R_2$ is a linear or branched $C_1$-$C_{20}$ alkyl, or phenyl. Exemplary silanes include, but are not limited to, trimethoxy(octyl) silane, triethoxy(octyl)silane, triethoxy(capryl)silane, and triethoxy(vinyl)silane.

Siloxanes are chemical compounds composed of units of the form $R_2SiO$, consisting of alternating silicon and oxygen atoms, with side chains R attached to the silicon atoms. Each R group is independently a hydrogen atom, a hydrocarbon group, or a halogen atom (such as chlorine). When at least one of the R groups is organic, the organic side chain confers hydrophobic properties while the —Si—O—Si—O— backbone is purely inorganic. Exemplary siloxanes include, but are not limited to, hexamethyldisiloxane, hexamethylcyclotrisiloxane, octamethyltrisiloxane, decamethyltetrasiloxane, and polydimethylsiloxane.

In some embodiments, the water-repellent admixture contains an alkoxysilane compound of the formula (or partial condensation products thereof):

wherein:
each $R_1$ independently is a linear or branched $C_1$-$C_3$ alkyl;
$R_3$ is a linear or branched $C_1$-$C_{20}$ alkyl, or phenyl;
a is 0 or 1; b is 1 or 2; c is 1 to 18; and
X is H, Cl, Br, I, $NH_2$, SCN, CN, $N_3$, NHR, $N(R)_2$, $N(R)_3$ or aryl when b=1,
X is alkenyl when b=2,
X is $S_x$, x=1 to 6 when b=2 and c=1 to 6,
X is a single bond when b=2 and c=1 to 12.

A fatty acid is a carboxylic acid with a long unbranched aliphatic tail (chain), which is either saturated or unsaturated. Most naturally occurring fatty acids have a chain of an even number of carbon atoms, from $C_4$ to $C_{28}$. Fatty acids may be derived from triglycerides or phospholipids. When they are not attached to other molecules, fatty acids are known as free fatty acids.

Fatty acids may also form fatty acid derivatives of the following formula:

$$R_{FA}COO\text{-}A$$

wherein $R_{FA}$ is a $C_7$-$C_{29}$ alkyl(ene) group; and wherein A is H, a $C_1$-$C_{12}$ linear or branched alkyl group, an alkali or alkaline earth metal cation, a polyvalent cation, or a $C_1$-$C_{12}$ linear or branched alkyl or alkanol amine. In certain embodiments, the fatty acids, or derivatives thereof, may include saturated or unsaturated $C_{12}$-$C_{24}$ fatty acids, such as $C_{16}$-$C_{18}$ fatty acids.

Fatty acid derivatives for use in compositions include those described in the published U.S. patent application of Karkare, Patent App. Publication No. 2002/0005149 A1 and in U.S. Pat. No. 5,460,648 to Walloch.

In certain embodiments, the fatty acids, or derivatives thereof, may include saturated or unsaturated $C_{12}$-$C_{24}$ fatty acids, such as $C_{16}$-$C_{18}$ fatty acids. In particular embodiments, the water-repellent admixture contains a combination of calcium and sodium salts of saturated and unsaturated $C_{16}$-$C_{18}$ fatty acids, wherein the sodium salt comprises from 0 to about 50% of the combined weight of the calcium and sodium salts of $C_{16}$-$C_{18}$ fatty acids.

In some embodiments, the fatty acid employed is stearic acid, a saturated $C_{18}$ fatty acid, or a stearate salt thereof. For example, stearates may be selected from calcium stearate, aluminum stearate, zinc stearate, sodium stearate, and magnesium stearate.

In some embodiments, the fatty acid employed is oleic acid, a monounsaturated $C_{18}$ fatty acid, or an oleate salt thereof. An exemplary oleate is sodium oleate.

In some embodiments, at least one stearate is calcium stearate and at least one oleate is sodium oleate. In certain embodiments, the water-repellent admixture contains a blend of calcium stearate with sodium oleate and/or a blend of zinc stearate with sodium oleate. In certain embodiments, the water-repellent admixture contains a blend consisting of (i) a first source of calcium stearate combined with (ii) a mixture containing a second source of calcium stearate plus sodium oleate, wherein the mixture is from about 25% to about 75% of the blend, such as about 30%, 40%, 50%, or 60% of the blend by weight. The second source of calcium stearate may have a different purity, particle size, lubricity, and/or water repellency, compared to the first source of calcium stearate.

The water-repellent admixture may have a stearate/oleate mass ratio of 1 or more, such as about 1.5, 2, 2.5, 3, 3.5, 4, 4.5, 5, 6, 7, 8, 9, 10, or more.

In some embodiments, the water-repellent admixture contains one or more materials selected from particulated polymers. Examples of particulated polymers include, but are not limited to, polyepoxide, polystyrene-butadiene, polyvinyl acetate, polyacrylonitile-butadiene, polyacrylic ester, polyvinylidene chloride-vinyl chloride, polyethylene-vinylacetate, polyurethane, acrylic latex, polymethacrylic ester, and copolymers of these polymers.

In some embodiments, the water-repellent admixture is present in a pre-blended dry mortar mix in an amount ("dosage") of at least about 0.01%, 0.02%, 0.03%, 0.04%, 0.05%, 0.06%, 0.07%, 0.08%, 0.09%, 0.10%, 0.12%, 0.15%, 0.18%, 0.20%, 0.25%, 0.30%, 0.35%, 0.40%, 0.50%, 0.60%, 0.75%, 0.90%, 1.0%, or higher, of the combined weight of all of the materials in the pre-blended dry mortar mix (including the admixture). In certain embodiments (e.g., see Examples 1-6 herein), the water-repellent admixture is present in a pre-blended dry mortar mix in a dosage selected from about 0.08% to about 0.35% of the pre-blended dry mortar mix, such as from about 0.08% to about 0.30% or about 0.12% to about 0.25% of the pre-blended dry mortar mix.

The water-repellent admixture may further include various diluents, processing aids, and/or dispersing aids. For example, the water-repellent admixture may further include sand, silica, alumina, or ground limestone.

The water-repellent admixture may be introduced as a solid additive into a dry mortar mix, which may be provided as a pre-blended mixture. The term "pre-blended dry mortar mix" should not be construed as limiting and includes any mixture comprising a water-repellent admixture and a cementitious material. The pre-blended dry mortar mix may further include aggregate (such as sand), in some embodiments. The term "pre-blended" means that the water-repellent admixture is blended (combined or mixed) with a cementitious material before the cementitious material reacts as a binder for aggregate materials.

It is convenient to provide a pre-blended dry mortar mix that includes the water-repellent admixture, from a processing standpoint. Namely, it avoids the need for a mason to add a separate admixture (whether liquid or solid) to the mortar. Air entrainment may be reduced. Practically, providing a pre-blended dry mortar mix means that there is no chance that the admixture will not be present in the final material, as long as the correct dry mortar mix is used.

When a pre-blended dry mortar mix is combined with water, a plastic mortar is produced. The plastic mortar is a workable paste used to bind construction blocks together and fill the gaps between them. The blocks (or other forms) may be bricks, concrete masonry units, clay masonry units, etc. Plastic mortar becomes hard when it sets, resulting in a rigid structure, or hardened mortar.

Some variations provide compositions comprising a cementitious material and a dry water-repellent admixture, wherein the water-repellent admixture contains one or more materials selected from the group consisting of silanes, siloxanes, free fatty acids, fatty acid derivatives, stearates, oleates, particulated polymers, and particulated copolymers, and wherein the water-repellent admixture is present in the composition in a concentration from about 0.03 wt % to about 5 wt %.

In some embodiments, the water-repellent admixture is present in the composition in a concentration from about 0.15 wt % to about 2.5 wt %, such as from 0.30 wt % to about 1.5 wt %.

The composition comprising a cementitious material and a dry water-repellent admixture may further comprise an aggregate, such as sand or small rocks. When the composition is combined with water, a masonry mortar may be formed.

Generally speaking, admixtures to be used in concrete construction should meet certain specifications. Tests should be made to evaluate how the admixture will affect the properties of the concrete with the specified job materials, under the anticipated ambient conditions, and by the anticipated construction procedures.

To be classified as a water-repellent admixture (i.e., additive) for masonry mortars, ASTM C1384 requires the water-uptake of the mortar (with the additive) to be less than or equal to 50% of the water-uptake of the blank mortar (without the additive) when tested in accordance with ASTM C1403, Standard Test Method for Rate of Water Absorption of Masonry Mortars, which is incorporated by reference herein. It is desired for the water-uptake of the mortar (relative to the blank) to be less than or equal to a selected value less than 50%, such as 40%, 45%, or 48%, to assure the product will meet the 50% maximum even when allowing for variability in manufacturing. Both ASTM C1384 and ASTM C1403 are incorporated by reference herein.

The water-repellent admixture should not adversely affect the workability of the plastic mortar, or the properties of the hardened mortar. Adversely affected workability may cause processing difficulties and higher labor or material costs. Adversely affected hardened-mortar properties may cause poor performance, higher maintenance costs, and possibly safety concerns. Two parameters that impact workability and final properties are air content and water demand of the mortar.

The presence of air can cause serious reductions in strength properties. Generally speaking, higher air content in the mortar will reduce compressive strength and bond strength. Preferably, the addition of the water-repellent admixture to a mortar does not dramatically affect the air content. Air may be introduced into the mortar, for example, through air entrainment. Water-repellent admixture compositions and/or dosages that do not tend to entrain air are preferable in this regard.

In some embodiments, addition of the water-repellent admixture does not increase the air content of a cement-lime mortar by more than 2 percentage points (on a volume basis), compared to the mortar without the water-repellent admixture. Cement-lime mortars typically should contain less than about 12 wt % air.

It can also be important that the air content not be dramatically reduced with the addition of the water-repellent admixture, compared to the mortar without the water-repellent admixture. A significant decrease in the air content of the plastic mortar may cause workability problems, or may negatively impact the final appearance of the hardened mortar. In some embodiments, addition of the water-repellent admixture does not decrease the air content of a cement-lime mortar by more than 2 percentage points (on a volume basis), compared to the mortar without the water-repellent admixture.

Other types of mortars may have other requirements as to control of air content. Masonry cement mortars generally may contain more air compared to cement-lime mortars, and thus may be able to tolerate somewhat larger changes in air content. Masonry cement mortars typically should contain less than about 18 wt % air. In some embodiments, the addition of the water-repellent admixture does not increase or decrease the air content of a masonry cement mortar by more than ±3% (volume basis).

These constraints regarding air content will help ensure that the compressive strength and bond strength of the mortar is within 10% of the strength of a blank mortar made without the water-repellent admixture, for example. In various embodiments, the compressive strength and bond strength of the mortar is within 2%, 5%, 8%, 9%, 10%, 11%, 12%, 15%, or 20% of the strength of a blank mortar made without the water-repellent admixture. At the same time, the water-repellency level of the mortar preferably meets the requirements of ASTM C1384 or another standard.

The pre-blended dry mortar mix may be combined with water to form a masonry mortar. There will be certain water requirements, or water demand, of the pre-blended dry mortar mix in order to produce a masonry mortar.

Preferably, the addition of the water-repellent admixture to a mortar does not dramatically affect the water demand of the mortar. In various embodiments, the water demand of the pre-blended dry mortar mix (including the water-repellent admixture) is within 1%, 2%, 5%, 8%, 9%, 10%, 11%, 12%, 15%, or 20% of the water demand of a blank mortar made without the water-repellent admixture.

There are a wide variety of commercial uses for water-repellent admixtures provided herein. A water-repellent admixture may be sold directly to another party who then combines the admixture with a cementitious material, or uses the admixture to produce a cementitious material. A solid water-repellent admixture may be combined with a cementitious material to produce a pre-blended dry mortar mix. A solid water-repellent admixture, or a material containing the admixture, may be combined with aggregate (e.g., sand, rocks, gravel, etc.) to produce a pre-blended dry mortar mix. A solid water-repellent admixture may be combined with a pre-blended dry mortar mix and water to produce a masonry mortar that is plastic. A hardened mortar, formed from curing a masonry mortar, may be produced in the form of various products or disposed adjacent to concrete blocks or other forms. Combinations of any of the foregoing are possible, and other additives may be included.

In some embodiments, dry cementitious products (including Portland cement, limes, cement-lime, masonry cement, mortar cement, blended cement, slag cement, fly ash or other pozzolanic materials) used in making masonry mortars have a water-repellent admixture incorporated into them. Some embodiments provide a pre-blended dry mortar mix which includes dry sand in addition to a dry cementitious material comprising a dry water-repellent admixture.

A water-repellent admixture may be sold to producers of dry cementitious materials (including cement-lime, masonry cement, and mortar cements) used in making masonry mortars. A water-repellent admixture may be sold to producers of pre-blended dry mortar mixes that include dry sand in addition to dry cementitious materials. These producers will, in turn, sell their products to the end user (typically a mason) who will either mix the dry cementitious material with sand and water to form a masonry mortar, or will simply add water to the pre-blended dry mortar mix to form a masonry mortar.

Water-repellent admixtures as disclosed herein may generally be employed as admixtures for concrete masonry units and mortar, concrete pavers, blocks, bricks, sidewalks, parking surfaces, retaining walls, grout, and other structural, functional, or ornamental forms.

EXAMPLES

Water-repellent admixtures of various compositions have been tested at a variety of dosage rates. In these examples, the pre-blended dry mortar mix includes the cementitious materials and fine aggregate (sand). Amounts shown as % M are the content as percent of total dry components (cement, lime, aggregate) of mortar. For example, 0.20% M indicates that water-repellent powder was added at a level of 0.20 wt % of total dry components of the mortar.

Water uptake was measured pursuant to ASTM C1403. This value is shown as "% AT (Rel to Blank)" (relative to the blank without the water-repellent admixture) in the data tables of FIGS. 1-5. The "Rel Comp Strength" is the relative compressive strength compared to the blank. The "w/c" value is the water/cement ratio of the cement-based material including the water-repellent admixture.

In FIGS. 1-5, PC/L is Portland cement/lime and MC is masonry cement. The chemical compositions of the tested water-repellent admixtures are indicated using the codes in Table 1. Sources 1-5 correspond to five commercial suppliers.

Example 1

Figure 1:
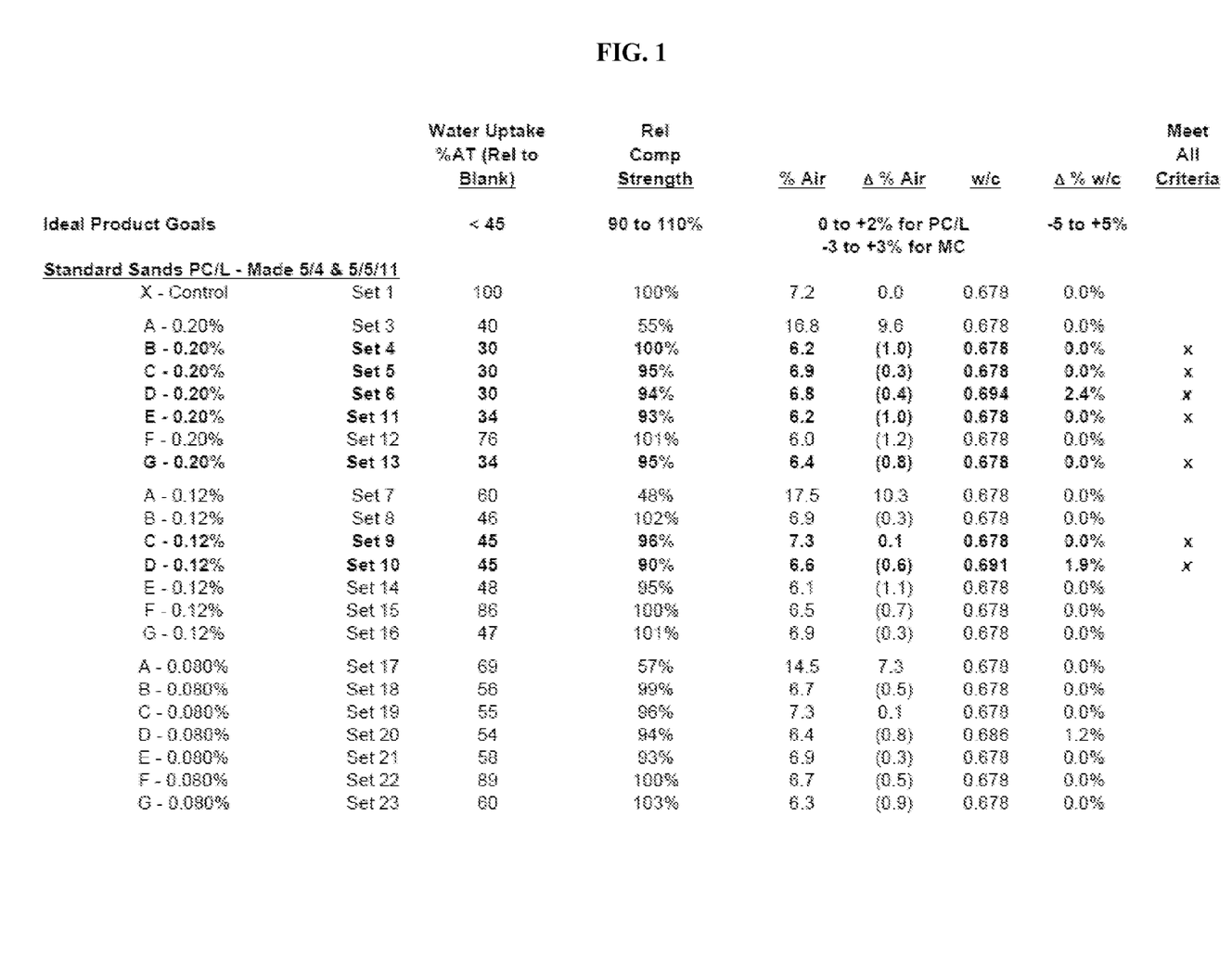
FIG. 1 provides experimental data in tabular format for Example 1.

Several water-repellent admixtures have been tested at a variety of dosage rates from 0.08% to 0.20% of the combined weight of all of the materials in the dry PC/L mortar. The tested compositions in this example were A, B, C, D, E, F, G, and X (the control blank mortar with no admixture). FIG. 1 provides a summary of the data in tabular format. Several admixtures met all of the ideal product goals for water uptake, compressive strength, air content and water/cementitious (w/c) ratio when compared to the control. These included B, C, D, E and G at 0.20% dosage rate, as well as C and D at 0.12% dosage rate. None of the admixtures met all of the criteria at 0.08% dosage. Admixtures A and F did not meet all of the criteria at any of the dosage rates and were deemed not to be acceptable for use in PC/L mortars when used alone at these dosage rates.

TABLE 1

Identification key for experimental samples in Examples 1-5.

| Code | Composition | Source |
|------|-------------|--------|
| A | Silane/Siloxane | 1 |
| B | Calcium Stearate | 2 |
| C | Aluminum Stearate | 3 |
| D | Aluminum Stearate | 3 |
| E | Calcium Stearate | 3 |
| F | Calcium Stearate | 3 |
| G | Calcium Stearate | 4 |
| K | 50% Calcium Stearate/ 50% Sodium Oleate | 4 |
| L | Calcium Stearate/ Air Entraining Fatty Acid | 4 |
| M | 50% Zinc Stearate/ 50% Sodium Oleate Blend | 4 |
| N | Zinc Stearate | 5 |
| X | Blank (Control) | — |

Example 2

Figure 2:
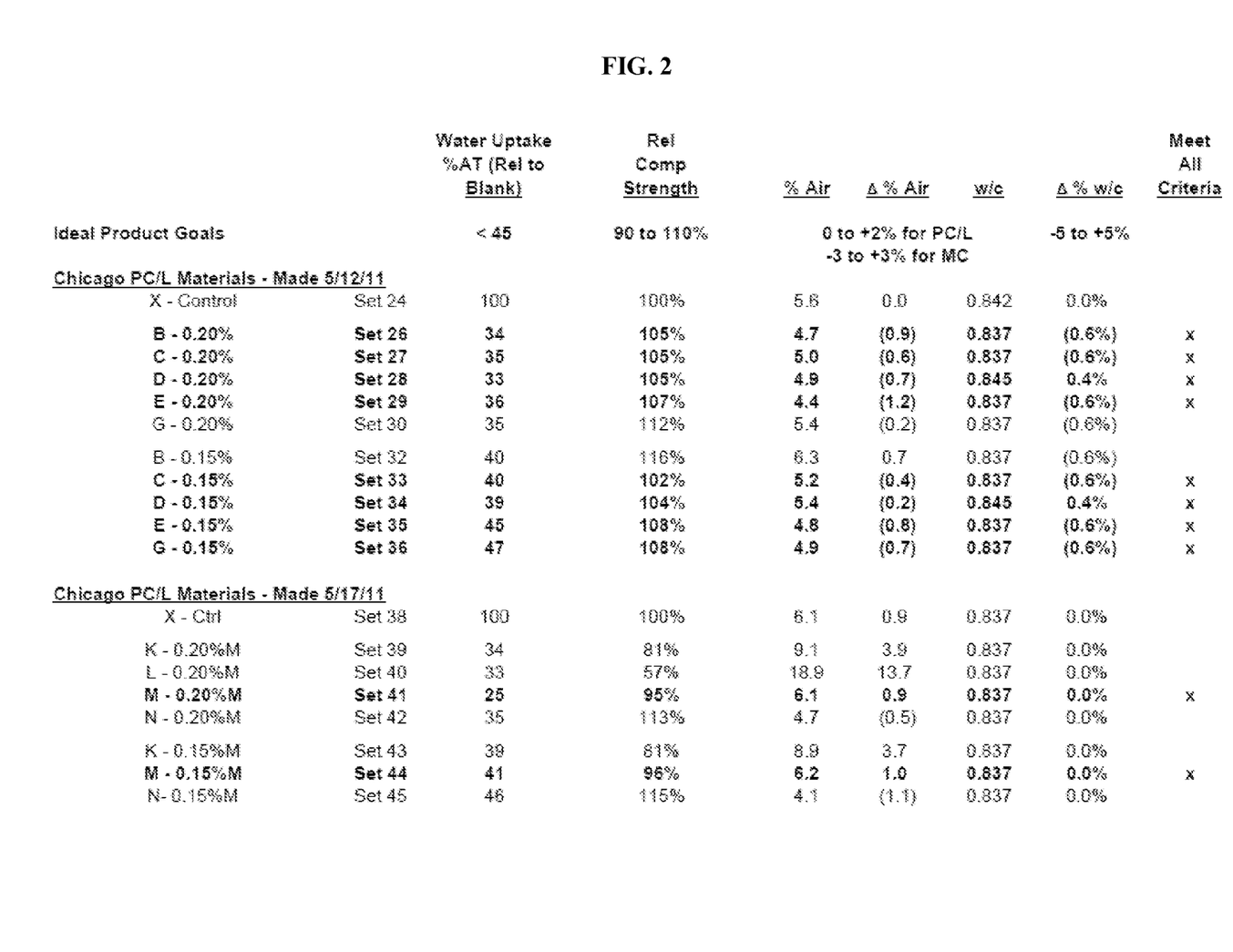
FIG. 2 provides experimental data in tabular format for Example 2.

Several water-repellent admixtures have been tested at a variety of dosages rates from 0.15% to 0.20% of the combined weight of all materials in the dry PC/L mortar. The tested compositions in this example were B, C, D, E, G, K, L, M, N, and X (the control blank mortar with no admixture). FIG. 2 provides a summary of the data in tabular format. Several admixtures met all of the ideal product goals for water uptake, compressive strength, air content and water/cementitious (w/c) ratio when compared to the control. These included B, C, D, E, and M at 0.20% dosage rate, as well as C, D, E G, and M at 0.15% dosage rate. Admixtures K, L and N did not meet all of the criteria at any of the dosage rates and were deemed not to be acceptable for use in PC/L mortars when used alone at these dosage rates.

Example 3

Figure 3:
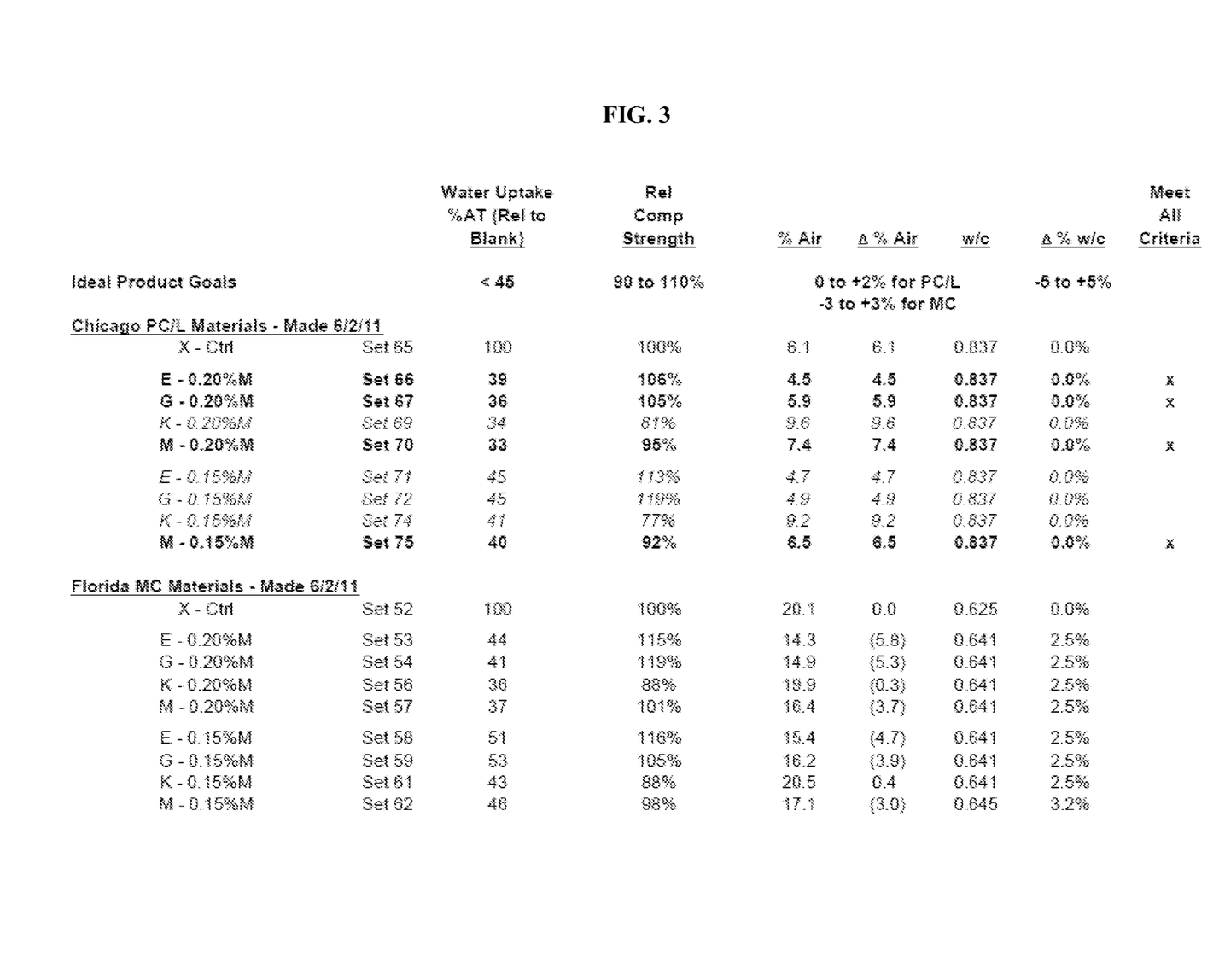
FIG. 3 provides experimental data in tabular format for Example 3.

Several water-repellent admixtures have been tested at a variety of dosages rates from 0.15% to 0.20% of the combined weight of all materials in both a dry PC/L and MC mortar. The tested compositions in this example were E, G, K, M, and X (the control blank mortar with no admixture). FIG. 3 provides a summary of the data in tabular format. Several admixtures met all of the ideal product goals for water uptake, compressive strength, air content and water/cementitious (w/c) ratio when compared to the control when used in the PC/L mortar. These included E, G, and M at 0.20% dosage rate, as well as M at 0.15% dosage rate. None of the admixtures met all of the criteria when used in the MC mortar. This demonstrates that none of these admixtures when used alone is suitable for use in both a PC/L and MC mortar at these dosage rates.

Example 4

Figure 4:
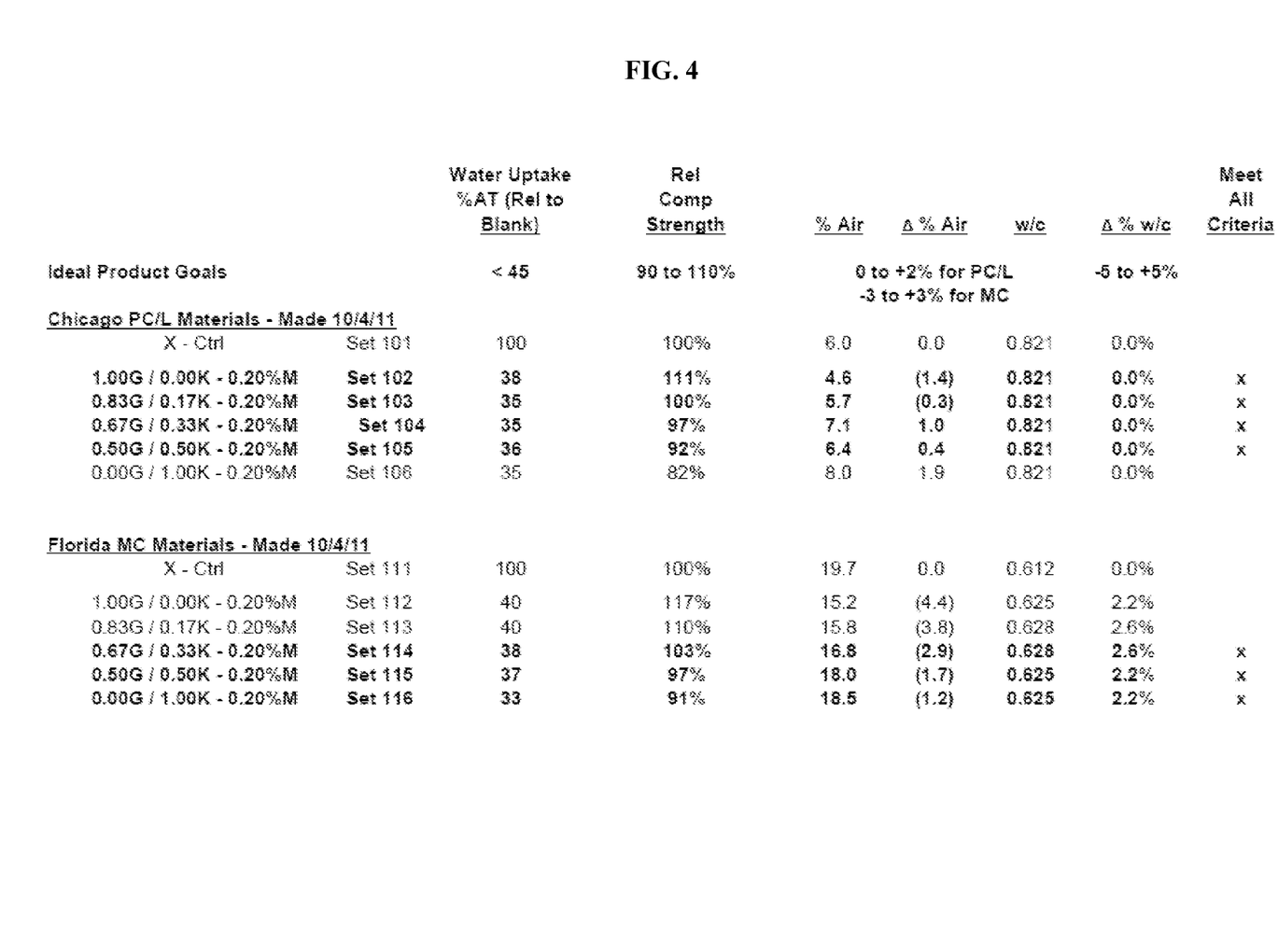
FIG. 4 provides experimental data in tabular format for Example 4.

Several water-repellent admixtures have been tested at a dosages rate of 0.20% of the combined weight of all materials in both a dry PC/L and MC mortar. The tested compositions in this example were combinations of G and K in ratios of 1.00G/0.00K, 0.83G/0.17K, 0.67G/0.33K, 0.50G/0.50K and 0.00G/1.00K, along with X (the control blank mortar with no admixture). FIG. 4 provides a summary of the data in tabular format. Several admixtures met all of the ideal product goals for water uptake, compressive strength, air content and water/cementitious (w/c) ratio when compared to the control when used in the PC/L mortar. These included all of the ratios except 0.00G/1.00K. In the MC mortar, all of the ratios met all of the criteria except 1.00G/0.00K and 0.83G/0.17K. The only two ratios that met all of the criteria in both the PC/L and MC mortars were 0.67G/0.33K and 0.50G/0.50K. This demonstrates that blends of G and K in these ratios are suitable for use in both a PC/L and MC mortar at 0.20% dosage rate. Admixtures G and K used alone or in different ratios are less suitable for use in both PC/L and MC mortars.

Example 5

Figure 5:
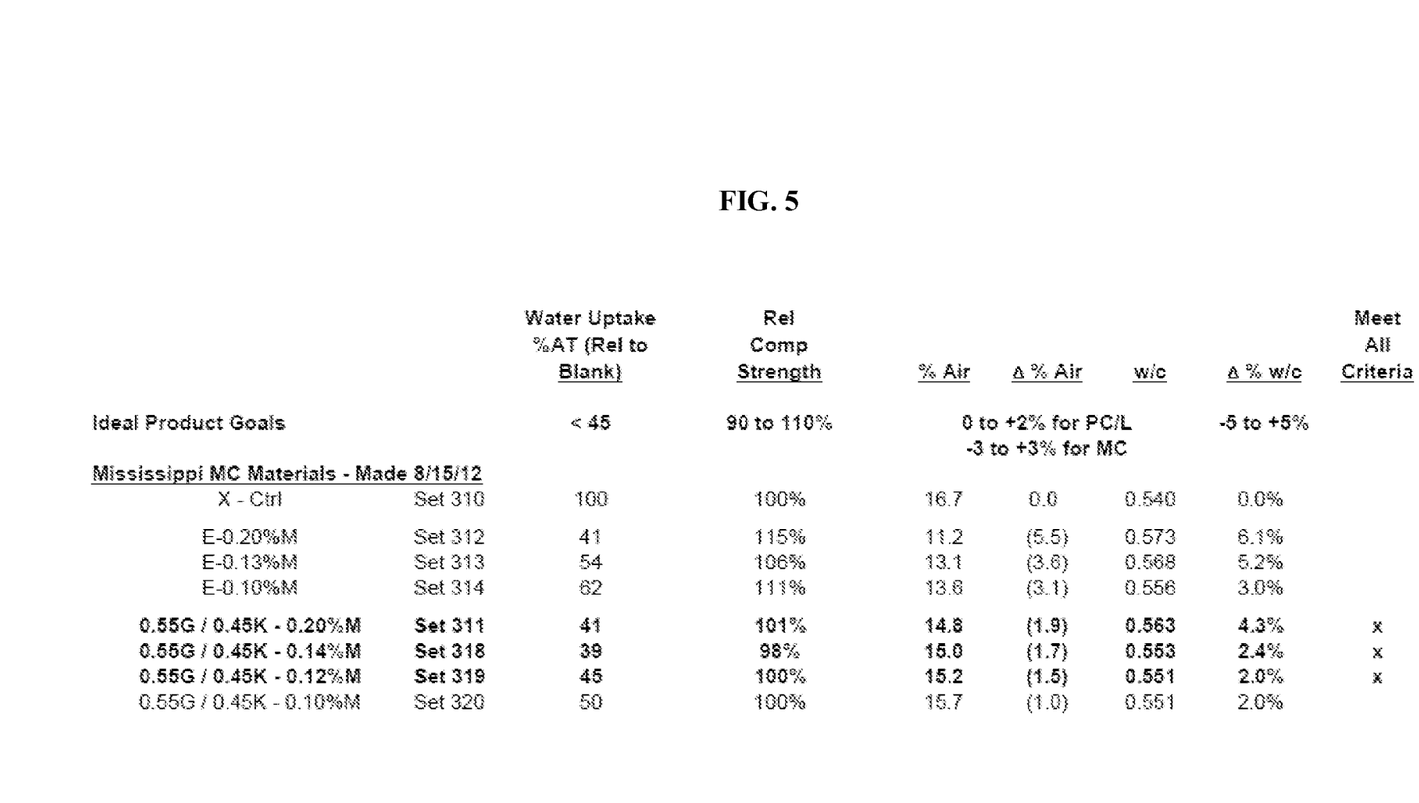
FIG. 5 provides experimental data in tabular format for Example 5.

Two water-repellent admixtures have been tested at a variety of dosages rates of 0.10% to 0.20% of the combined weight of all materials in a different dry MC mortar. The tested compositions in this example were E used alone, and a combinations of G and K in ratios of 0.55G/0.45K, along with X (the control blank mortar with no admixture). FIG. 5 provides a summary of the data in tabular format. Only the 0.55G/0.45K combination admixture met all of the ideal product goals for water uptake, compressive strength, air content and water/cementitious (w/c) ratio when compared to the control when used in the MC mortar at all dosages from 0.12 to 0.20%. The admixture E when used alone did not meet all of the criteria at any dosage rate from 0.10% to 0.20%. This demonstrates that an optimized blend of G and K is particularly effective for use in a MC mortar at a range of dosage rates from 0.12% to 0.20%, while a single admixture E is not as effective over the same dosage range.

In this detailed description, reference has been made to multiple embodiments of the disclosure and non-limiting examples relating to how the disclosure can be understood and practiced. Other embodiments that do not provide all of the features and advantages set forth herein may be utilized, without departing from the spirit and scope of the present disclosure. This disclosure incorporates routine experimentation and optimization of the methods and systems described herein. Such modifications and variations are considered to be within the scope of the invention defined by the claims.

All publications, patents, and patent applications cited in this specification are herein incorporated by reference in their entirety as if each publication, patent, or patent application were specifically and individually put forth herein. Additionally, all ASTM or other standards cited herein are incorporated by reference, including all past and current versions of the standards as of the present filing date.

Where methods and steps described above indicate certain events occurring in certain order, those of ordinary skill in the art will recognize that the ordering of certain steps may be modified and that such modifications are in accordance with the variations of the disclosure. Additionally, certain of the steps may be performed concurrently in a parallel process when possible, as well as performed sequentially.

Therefore, to the extent there are variations of the disclosure, which are within the spirit of the disclosure or equivalent to the inventions found in the appended claims, it is the intent that this patent will cover those variations as well. The present invention shall only be limited by what is claimed.

What is claimed is:

1. A pre-blended dry mortar mix consisting essentially of a cementitious material, an aggregate, and a dry water-repellent admixture,
    wherein said water-repellent admixture contains (i) at least one stearate selected from the group consisting of calcium stearate, aluminum stearate, zinc stearate, sodium stearate, and magnesium stearate; and (ii) at least one oleate selected from the group consisting of sodium oleate, potassium oleate, magnesium oleate, and calcium oleate, wherein said water-repellent admixture has a stearate/oleate mass ratio of from 2 to 10;
    wherein said water-repellent admixture is present in said dry mortar mix in a dosage from about 0.10% to about 0.50% by weight of said dry mortar mix;
    wherein said dry mortar mix is combinable with water to form a masonry mortar, which is curable to form a hardened mortar; and
    wherein said dry mortar mix is characterized by the following properties:
    (a) water demand of said dry mortar mix, to form said masonry mortar, is within 5% of water demand of a dry mortar mix that does not contain said water-repellent admixture;
    (b) air content of said masonry mortar is within about 3 percentage points (on a volume basis) of air content of a masonry mortar that does not contain said water-repellent admixture;
    (c) said hardened mortar has water uptake of about 50% or less of water uptake of a blank mortar that does not contain said water-repellent admixture, when tested in accordance with ASTM C1403; and
    (d) said hardened mortar has compressive strength within about 15% of compressive strength of a blank mortar that does not contain said water-repellent admixture.

2. The dry mortar mix of claim 1, wherein said water-repellent admixture is present in said dry mortar mix in a dosage from about 0.10% to about 0.30% by weight of said dry mortar mix.

3. The dry mortar mix of claim 1, wherein said at least one stearate is calcium stearate and said at least one oleate is sodium oleate.

4. The dry mortar mix of claim 1, wherein said stearate/oleate mass ratio is from 3 to 5.

5. The dry mortar mix of claim 1, wherein said air content of said masonry mortar containing said water-repellent admixture is within about 2 percentage points (on a volume basis) of a masonry mortar that does not contain said water-repellent admixture.

6. The dry mortar mix of claim 1, wherein said hardened mortar has a water uptake of about 45% or less of the water uptake of a blank mortar that does not contain said water-repellent admixture, when tested in accordance with ASTM C1403.

7. The dry mortar mix of claim 1, wherein said hardened mortar has compressive strength within about 10% of compressive strength of a blank mortar that does not contain said water-repellent admixture.

8. The dry mortar mix of claim 1, wherein bond strength of said hardened mortar is within about 10% of bond strength of a blank mortar that does not contain said water-repellent admixture.

9. A masonry mortar consisting essentially of water and a pre-blended dry mortar mix comprising a cementitious material, an aggregate, and a water-repellent admixture,
- wherein said water-repellent admixture contains (i) at least one stearate selected from the group consisting of calcium stearate, aluminum stearate, zinc stearate, sodium stearate, and magnesium stearate; and (ii) at least one oleate selected from the group consisting of sodium oleate, potassium oleate, magnesium oleate, and calcium oleate, wherein said water-repellent admixture has a stearate/oleate mass ratio of from 2 to 10;
- wherein said water-repellent admixture is present in said dry mortar mix in a dosage from about 0.10% to about 0.50% by weight of said dry mortar mix;
- wherein water demand of said dry mortar mix, to form said masonry mortar, is within 5% of water demand of a dry mortar mix that does not contain said water-repellent admixture; and
- wherein air content of said masonry mortar is within about 3 percentage points (on a volume basis) of air content of a masonry mortar that does not contain said water-repellent admixture.

10. The masonry mortar of claim 9, wherein said water-repellent admixture is present in said dry mortar mix in a dosage from about 0.10% to about 0.30% by weight of said dry mortar mix.

11. The masonry mortar of claim 9, wherein said at least one stearate is calcium stearate and said at least one oleate is sodium oleate.

12. The masonry mortar of claim 9, wherein said stearate/oleate mass ratio is from 3 to 5.

13. The masonry mortar of claim 9, wherein said air content of said masonry mortar is within about 2 percentage points (on a volume basis) of a masonry mortar that does not contain said water-repellent admixture.

14. A cured hardened mortar consisting essentially of a pre-blended dry mortar mix comprising a cementitious material, an aggregate, and a water-repellent admixture,
- wherein said water-repellent admixture contains (i) at least one stearate selected from the group consisting of calcium stearate, aluminum stearate, zinc stearate, sodium stearate, and magnesium stearate; and (ii) at least one oleate selected from the group consisting of sodium oleate, potassium oleate, magnesium oleate, and calcium oleate, wherein said water-repellent admixture has a stearate/oleate mass ratio of from 2 to 10;
- wherein said water-repellent admixture is present in said dry mortar mix in a dosage from about 0.10% to about 0.50% by weight of said dry mortar mix;
- wherein said hardened mortar has water uptake of about 50% or less of water uptake of a blank mortar that does not contain said water-repellent admixture, when tested in accordance with ASTM C1403; and
- wherein said hardened mortar has compressive strength within about 15% of compressive strength of a blank mortar that does not contain said water-repellent admixture.

15. The hardened mortar of claim 14, wherein said water-repellent admixture is present in said dry mortar mix in a dosage from about 0.10% to about 0.30% by weight of said dry mortar mix.

16. The hardened mortar of claim 14, wherein said at least one stearate is calcium stearate and said at least one oleate is sodium oleate.

17. The hardened mortar of claim 14, wherein said stearate/oleate mass ratio is from 3 to 5.

* * * * *